(12) United States Patent
Brandt

(10) Patent No.: US 8,210,561 B2
(45) Date of Patent: *Jul. 3, 2012

(54) SKI BOOTS

(75) Inventor: Helmut Brandt, Leopoldsdorf (AT)

(73) Assignee: Tyrolia Technology GmbH (AT)

( * ) Notice: Subject to any disclaimer, the term of this patent is extended or adjusted under 35 U.S.C. 154(b) by 121 days.

This patent is subject to a terminal disclaimer.

(21) Appl. No.: 12/791,502

(22) Filed: Jun. 1, 2010

(65) Prior Publication Data

US 2010/0236102 A1  Sep. 23, 2010

Related U.S. Application Data

(62) Division of application No. 10/580,304, filed as application No. PCT/EP03/13175 on Nov. 24, 2003, now Pat. No. 7,784,814.

(51) Int. Cl.
*A63C 9/00* (2006.01)

(52) U.S. Cl. ......... 280/613; 280/617; 280/618; 280/625

(58) Field of Classification Search ................. 280/618, 280/625, 607, 613, 616, 633, 634, 14.22, 280/11.22, 617; 36/117.3, 10, 31

See application file for complete search history.

(56) References Cited

U.S. PATENT DOCUMENTS

| | | |
|---|---|---|
| 3,852,896 A | 12/1974 | Pyzel et al. |
| 3,987,533 A | 10/1976 | Sandgren |
| 4,078,322 A | 3/1978 | Dalebout |
| 4,083,128 A | 4/1978 | Rossman |
| 4,141,570 A | 2/1979 | Sudmeier |
| 4,177,584 A | 12/1979 | Beyl |
| 4,245,409 A | 1/1981 | Beyl |
| 4,408,779 A | 10/1983 | Shekter |
| 5,071,154 A | 12/1991 | Szasz et al. |
| 5,261,688 A | 11/1993 | Rohrmoser |
| 5,273,305 A | 12/1993 | Erdei et al. |
| 5,344,178 A * | 9/1994 | Rohrmoser ................... 280/617 |

(Continued)

FOREIGN PATENT DOCUMENTS

DE  36 02 636  4/1987

(Continued)

OTHER PUBLICATIONS

Opposition paper filed in the EPO by Salomon SAS on Oct. 14, 2009, against European Patent EP 1 687 072 B1 of the applicant Tyrolia Technology GmbH, which corresponds to U.S. Appl. No. 10/580,304, filed May 22, 2006.

(Continued)

*Primary Examiner* — Hau Phan
(74) *Attorney, Agent, or Firm* — Ostrolenk Faber LLP

(57) ABSTRACT

Ski boots of different sizes, adapted for being used with skis provided with mounted bindings having front and rear jaws. The ski boots are embodied in at least two types (1, 1', 1") which differ from each other by sole length (a, b, c). Each of the ski boot types comprises at least two ski boot (outer shell) sizes having the same sole length. Each ski boot size is suitable for receiving inner boots in at least one inner boot size (foot size), and advantageously inner boots ($3a$ to $3d$, $3'a$ to $3'd$, $3"a$ to $3"d$) in at least two boot sizes ($2a$-$2b$, $2'a$-$2'$-$b$, $2"a$-$2"b$). Skis (6, 6', 6") may be provided with fixed jaws ($7a$, $7b$, $8a$, $8b$, $9a$, $9b$) mounted in such a way that they correspond to the sole lengths (a, b, c) of the different types of boots (1, 1', 1").

24 Claims, 2 Drawing Sheets

U.S. PATENT DOCUMENTS

| | | | |
|---|---|---|---|
| 5,344,179 A * | 9/1994 | Fritschi et al. | 280/618 |
| 5,498,017 A | 3/1996 | Rohrmoser | |
| 5,575,496 A | 11/1996 | Luitz et al. | |
| 6,092,829 A * | 7/2000 | Mercier | 280/617 |
| 6,471,235 B1 | 10/2002 | Luitz et al. | |
| 6,779,810 B1 | 8/2004 | Mangold | |
| 7,036,842 B2 * | 5/2006 | Krumbeck et al. | 280/618 |
| 7,784,814 B2 * | 8/2010 | Brandt | 280/618 |
| 7,815,213 B2 * | 10/2010 | Damiani et al. | 280/611 |
| 7,887,081 B2 * | 2/2011 | Brandt | 280/617 |
| 2002/0092182 A1 | 7/2002 | Coplon et al. | |
| 2002/0113413 A1 | 8/2002 | Sosin et al. | |

FOREIGN PATENT DOCUMENTS

| | | |
|---|---|---|
| DE | 39 24 240 | 6/1990 |
| DE | 199 36 519 | 2/2001 |
| FR | 2 460 118 | 1/1981 |
| GB | 1 214 738 | 12/1970 |
| JP | 2-270519 | 11/1990 |
| JP | 6-284901 | 10/1994 |
| WO | 92/06607 | 4/1992 |
| WO | WO 96/13183 | 5/1996 |
| WO | WO 02/47776 A2 | 6/2002 |

OTHER PUBLICATIONS

Atomic Tech Manual 2002/03 catalogue, published on Feb. 2, 2002.
Atomic Alpine Collection 2002/03 catalogue, published Feb. 2, 2002.
Oxygen 2002/03 catalogue, published Feb. 2, 2002.
Atomic Rental-System catalogue, published on Feb. 1, 2003.

* cited by examiner

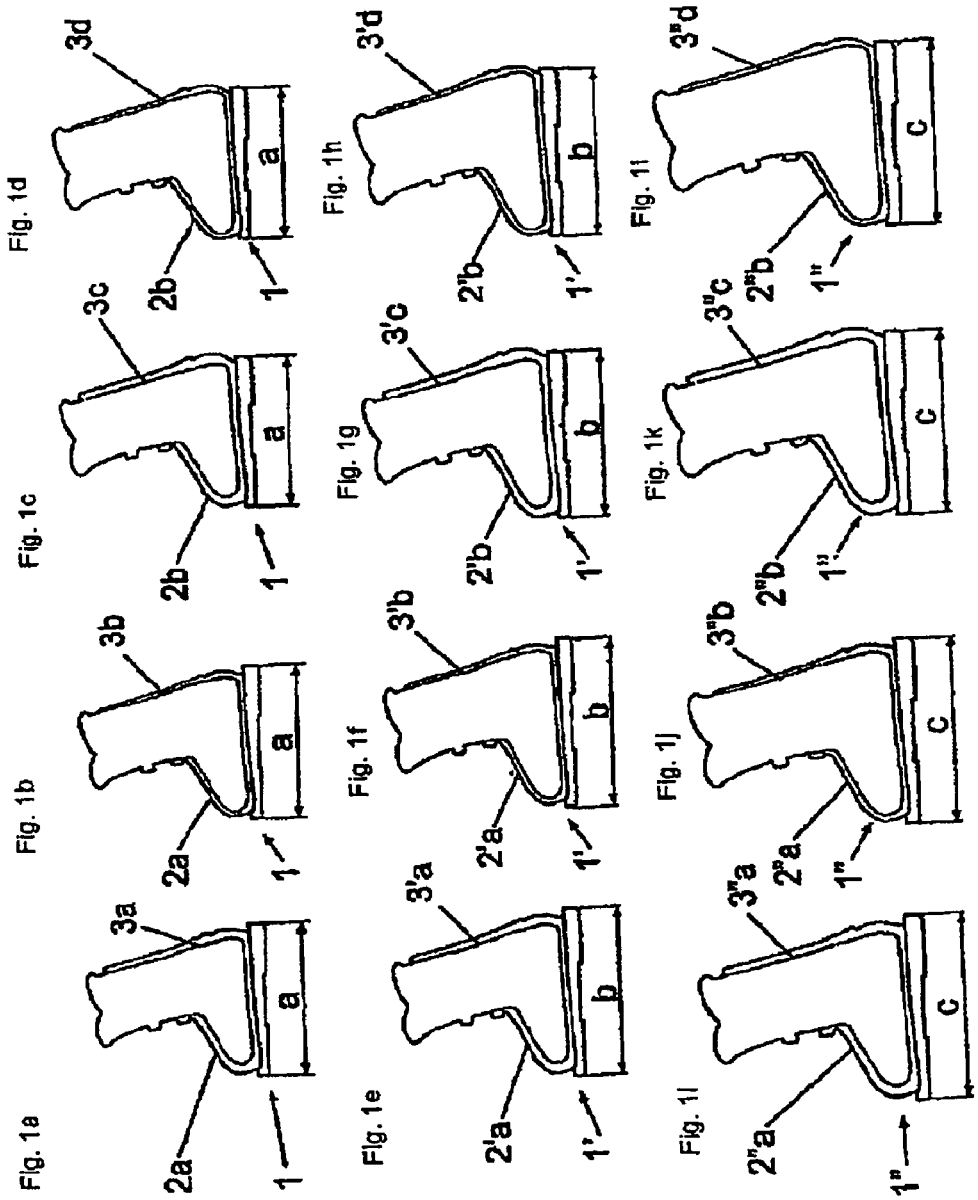

SKI BOOTS

CROSS-REFERENCE TO RELATED APPLICATION

The present application is a Divisional application of U.S. Ser. No. 10/580,304 filed May 22, 2006, which is a 35 U.S.C. §371 national phase conversion of PCT/EP2003/013175 filed Nov. 24, 2003, both incorporated by reference herein in their entirety.

This application is related to Ser. No. 11/576,517, filed Jan. 14, 2008 which is the U.S. National Phase of PCT/EP2004/011038 filed Oct. 2, 2004, also incorporated by reference in its entirety.

BACKGROUND

1. Technical Field

The invention relates to a plurality of ski boots being sized for different foot sizes but having a common sole length, and more particularly to ski boots wherein said common sole length adapts said plurality of ski boots for being easily matched with skis, including skis having fixed bindings.

2. Related Art

Ski-hire stations are usually equipped according to requirement with a number of skis of different types and different lengths with premounted ski bindings. Ski boots of different sizes complete the range. The ski bindings are arranged in such a way on the ski by suitable mechanisms so that the relative spacing of the two binding jaws can be set within a relatively wide range for adapting the binding to ski boots of different lengths. This gives rise to time-intensive setting and adjustment effort on the part of the personnel of the ski-hire stations. Ski-hire stations therefore also need well-trained personnel.

SUMMARY

This forms the starting point for the invention, which is based on the object of providing ski boots adapted for use with skis having premounted bindings, the ski boots having different sizes and being particularly suitable for a hire system, requiring less setting and adjustment effort and ensuring the customers and also the personnel of the hire station a simple, time-saving and clear procedure.

According to embodiments of the invention, disclosed are ski boots that belong to at least two ski boot (outer shell) sizes having the same sole length, and are each suitable for the insertion of inner boots in at least one boot size (foot size). Also disclosed is a combination comprising the aforesaid ski boots, and skis on which fixed binding jaws are mounted according to the corresponding sole length.

The boots according to the invention are optimally suitable for hire stations. The invention allows easy assignment of the boots from the ski boot types provided, to the skis provided with the bindings. It is no longer necessary to adapt the binding spacing to the selected boot that fits the customer. This makes the procedure easier for the personnel of the hire station and has for the customer the advantage of being very time-saving.

The invention further includes a large number of combinations of boots, of which some are particularly advantageous. In this regard, it is advantageous to provide as far as possible all desired ski boot sizes. In this connection, it is advantageous if the boots according to the invention comprise at least three ski boot types and if a number of shells of different size which, however, have corresponding sole lengths belong to each ski boot type.

In the case of three or more different ski boot types, it is advantageous if two shells of different size belong to each ski boot type. In this case, the boots according to the invention can be embodied especially simply in such a way that all the ski boot sizes usually desired can be provided.

For this, for example, a number, in particular two, of shells of each shell size of a ski boot type are provided, only one inner boot of a given size being insertable into each of these shells. These shells of the same size are embodied in particular in such a way that an inner boot of a given size fits into one shell and an inner boot of the next or neighboring size can be inserted into the other of these shells.

Advantageously, a plurality of inner boots of different foot sizes may be configured for being inserted into a given shell, or a given shell may be configured for receiving a plurality of inner boots of different foot sizes.

There accordingly may be shells of the same size which differ in their inner space. This can be brought about in a simple way, for example, with two shells of the same size, by adapting one to an inner boot of a smaller size by an insert, such as an insole or another suitable structure. Boots according to the invention can therefore be designed in very varied ways.

Ski boot shells and inner boots are of course provided in pairs in the corresponding number and size in the hire stations.

For the customer, it is above all important to be able to hire the combination of ski boot and ski suitable for him as rapidly as possible. It is therefore advantageous if the ski boot types and their shells and also the inner boots and the skis can be assigned to one another by means of corresponding codes or markings or the like.

BRIEF DESCRIPTION OF THE DRAWINGS

Further features, advantages and details of the invention are described in greater detail with reference to the drawings which represent an illustrative embodiment diagrammatically and in which FIGS. 1A-1L show ski boots belonging to an embodiment of the invention.

DETAILED DESCRIPTION

Figure 2A:
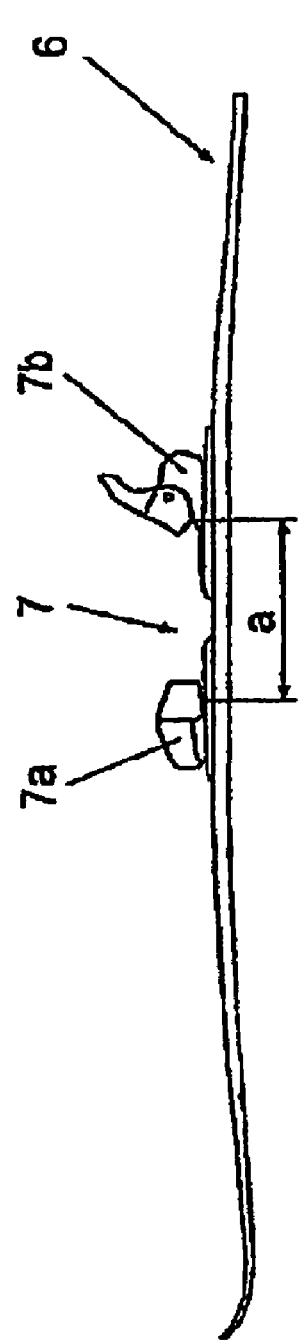
FIGS. 2A-2C show three skis of the same length belonging to an embodiment of a hire system.

FIGS. 1A-1L show components of a combination of ski boots for a hire system for alpine skiing, including at least two, in the embodiment illustrated three, different ski boot types 1, 1', 1". Two smaller outer shells 2a, 2'a, 2"a and two larger outer shells 2b, 2'b, 2"b belong in each case to a ski boot type 1, 1', 1". The shells 2a, 2b and 2'a, 2'b and also 2"a, 2"b belonging to each boot type 1, 1', 1" have in each case a corresponding sole length a, b, c. The two outer shells 2a are the same size at least on the outside; in particular, they are correspondingly embodied. This also applies for the other outer shells 2b, 2'a, 2'b, 2"a, 2"b which are the same size in pairs.

The two shells 2a of the same size of boot type 1 are embodied in such a way on the inside that one shell 2a can receive an inner boot 3a of size 23 and the associated half size, for example, and the second shell 2a can receive an inner boot 3b of size 24 and the associated half size. For this, at least one insert can be introduced into the shell 2a intended for the smaller inner boot of size 23 in order to adapt the inner space of the shell 2*a* to the smaller inner boot. The same applies for the two outer shells 2*b* and the inner boots 3*c*, 3*d* which can be inserted into them, which, for example, correspond to boot sizes 25 and 26.

The insert which makes the inner space of a shell smaller and adapts it to an inner boot of a given size can be a one-part or multi-part insert and is in particular made from plastic. An embodiment is furthermore preferred in which the insert lines the toe region of the inner space and/or the lateral regions adjoining the sole of the inner sides of the shell.

All the outer shells 2'*a* and 2'*b* belonging to ski boot type 1' have the sole length b and, as already mentioned, are of different size. An inner boot 3'*a* of boot size 27 and one of the associated half size, for example, can be inserted into one outer shell 2'*a* which, as likewise mentioned, is adapted accordingly on the inside via an insert, for example, and an inner boot 3'*b* of size 28 and of the associated half size can be inserted into the second outer shell 2'*a*. The same applies for the two shells 2'*b* and the inner boots 3'*c*, 3'*d* which can be inserted into them, which can correspond to boot sizes 29 and 30. The same also applies for the ski boots of ski boot type 1" with regard to the pairs of outer shells 2"*a*, 2"*b* and also with regard to the inner boots 3"*a* to 3"*d* which can be inserted into them, which can correspond to boot sizes 31 to 34.

Figure 2B:
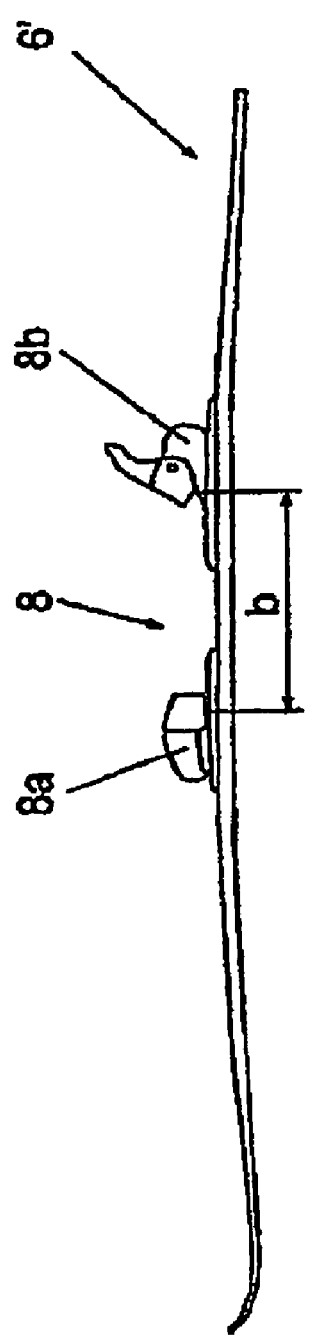
Figure 2C:
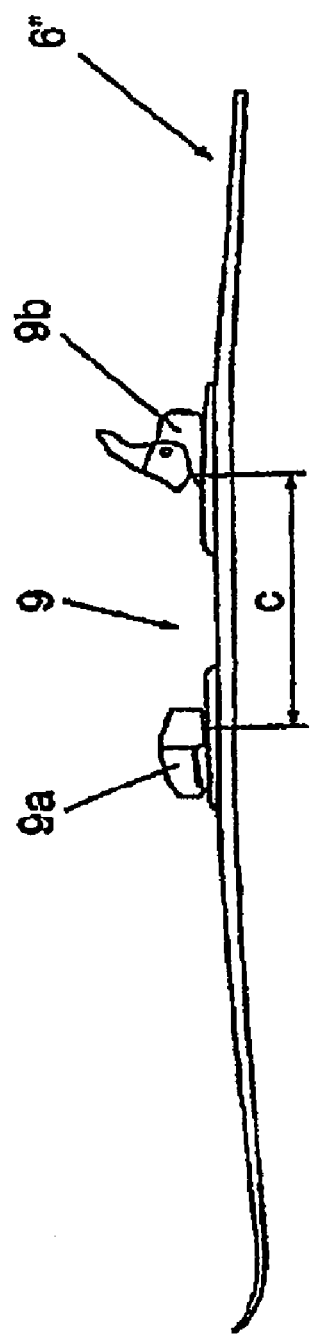

FIGS. 2A-2C show three skis 6, 6', 6" of the same length, which in each case belong to a ski pair, with mounted ski bindings 7, 8, 9 consisting in each case of a front jaw 7*a*, 8*a*, 9*a* and a heel jaw 7*b*, 8*b*, 9*b*. The two binding jaws 7*a*, 7*b* mounted on the ski 6 are with regard to their relative spacing geared to the sole length a of ski boot type 1, on the ski 6' the two binding jaws 8*a*, 8*b* are mounted according to the sole length b of ski boot type 1', and on the ski 6" the two binding jaws 9*a*, 9*b* are mounted according to the sole length c of ski boot type 1". A ski boot of type 1 can therefore be inserted into the binding 7, a ski boot of type 1' into the binding 8 and a ski boot of type 1" into the binding 9 without further adjustment.

It is consequently not necessary to have to adjust the bindings 7, 8, 9 with regard to their relative spacing. Use can therefore be made of a simple rail system for fastening the binding jaws to the ski without the possibility of longitudinal adjustment. With the binding jaws mounted at corresponding relative spacings according to the boot types, skis of different lengths and embodiments can be provided.

A combination of ski boots according to the invention, and skis for hire systems, comprises in each case a number of ski pairs 6, 6', 6" and a corresponding number of ski boot pairs of boot types 1, 1', 1" and is convenient and easy to handle. The handling of the hire system is particularly time-saving and convenient for the personnel of the ski-hire station especially when use is made of a coding system which allows simple assignment of the boots to the ski pairs. For example, coding systems are suitable which use colors in such a way that, for example, a ski boot type with a red marking fits into the binding of a ski which is likewise provided with a red marking. Any desired code can be provided on skis, boots and bindings.

Combinations according to the invention for hire systems comprise at least two, preferably three, or even more than three ski boot types (lengths) and/or for each ski boot type more than two shells of different size with the same sole length. It should also be mentioned that different ski binding systems can also be used within a hire system as long as appropriate binding connection regions for the ski boot shells are present.

Although particular embodiments have been described, many other variations and modifications and other uses will become apparent to those skilled in the art. Therefore, the present invention is not limited by the specific disclosure herein.

What is claimed is:

1. A plurality of ski boots for a number of consecutive foot sizes and adapted for being inserted into ski bindings comprising front and rear binding parts disposed on skis in spaced relationships according to the sole length of the ski boots,
   the plurality of ski boots comprising outer shells of at least two different outer dimensions, each outer shell having a fixed inner configuration for receiving at least one inner boot sized according to said inner configuration of said outer shell,
   said outer shells further having respective soles, said outer shells of said plurality of ski boots having only one same sole length.

2. The plurality of ski boots as claimed in claim 1 wherein the fixed inner configuration of each of the shells correspond to the respective sizes of the inner boots to be received in said shells.

3. The plurality of ski boots as claimed in claim 2 wherein each of the shells has a fixed inner configuration for receiving inner boots of a certain size and of an associated half size.

4. The plurality of ski boots as claimed in claim 2 wherein one of the outer shells is provided with a fixed inner configuration for receiving inner boots of a size different from the size of the inner boots fitting into one of the other different sized outer shells.

5. The plurality of ski boots as claimed in claim 2 wherein the inner boots fitting into a plurality of shells of different outer dimensions belong to a plurality of successive foot sizes.

6. The plurality of ski boots as claimed in claim 2 wherein inserts are provided for shells for configuring the interior spaces for matching corresponding inner boots.

7. The plurality of ski boots as claimed in claim 1 provided with shells of three different outer dimensions.

8. In combination, a number of pluralities of ski boots as claimed in claim 1 wherein each of the plurality of ski boots comprises soles of the same length, which length differs from the sole length of the other plurality provided or of the sole lengths of each of the other pluralities provided.

9. In combination, a number of pluralities of ski boots as claimed in claim 8 wherein the number of pluralities is at least two.

10. In combination, a number of pluralities of ski boots as claimed in claim 8 wherein the number of pluralities is three.

11. Ski boots adapted for being inserted in ski bindings mounted on skis and comprising front and rear binding parts disposed on the skis in different spaced relationships, comprising:
   a) a first plurality of ski boots each having a first sole length for matching a first binding spacing, said first plurality of ski boots comprising shells of first and second shell types;
   inner boots of first, second, third and fourth respective foot sizes;
   said first type shells having a fixed inner configuration for receiving said inner boots of said first and second foot sizes;
   said second type shells having a fixed inner configuration for receiving said inner boots of said third and fourth foot sizes; and
   b) a second plurality of ski boots each having a second sole length for matching a second binding spacing, said second plurality of ski boots comprising shells of third and fourth shell types;

inner boots of fifth, sixth, seventh and eighth respective foot sizes;

said third type shells having a fixed inner configuration for receiving said inner boots of said fifth and sixth foot sizes;

said fourth type shells having a fixed inner configuration for receiving said inner boots of said seventh and eighth foot sizes.

12. The ski boot of claim 11, wherein inserts are provided for at least some of said shells having first through fourth shell types for adapting said shells for matching corresponding inner boots of respective ones of said first through either foot sizes.

13. The ski boots of claim 12, wherein said insert lines a toe region of the corresponding said shell.

14. The ski boots of claim 12, wherein said insert lines lateral regions adjoining a sole of the corresponding said shell.

15. The ski boots of claim 11, characterized in that said shells and said inner boots have respective markings indicating which of said shells have which sole length, and which of said inner boots fit into which of said shells.

16. The ski boots as claimed in claim 11, characterized in that an inner boot of a given size matches one shell of a same shell type and an inner boot of a neighboring size matches another shell of the same shell type.

17. The ski boots as claimed in claim 11, further comprising (c) a third plurality of ski boots having shells of a respective third sole length adapted for being inserted in ski bindings mounted on skis and comprising front and rear binding parts disposed on the skis in a third binding spacing, said third plurality of ski boots (c) has shells of fifth and sixth shell types;

said fifth type shells having a fixed inner configuration for receiving inner boots of ninth and tenth foot sizes;

said sixth type shells having a fixed inner configuration for receiving inner boots of eleventh and twelfth foot sizes.

18. The ski boots of claim 17, wherein inserts are provided for at least some of said shells of said fifth and sixth shell types for adapting said shells for matching corresponding inner boots of respective ones of said ninth through twelfth foot sizes.

19. The ski boots of claim 18, wherein said insert lines a toe region of the corresponding said shell.

20. The ski boots of claim 18, wherein said insert lines lateral regions adjoining a sole of the corresponding said shell.

21. A method for providing ski boots adapted for being inserted in ski bindings mounted on skis and comprising front and rear binding parts disposed on the skis in different spaced relationships, comprising the steps of:

a) providing a first plurality of ski boots each having a first sole length for matching a first binding spacing, said first plurality of ski boots comprising shells of first and second shell types;

providing inner boots of first, second, third and fourth respective foot sizes;

said first type shells having a fixed inner configuration for receiving said inner boots of said first and second foot sizes;

said second type shells having a fixed inner configuration for receiving said inner boots of said third and fourth foot sizes;

b) providing a second plurality of ski boots each having a second sole length for matching a second binding spacing, said second plurality of ski boots comprising shells of third and fourth shell types;

providing inner boots of fifth, sixth, seventh and eighth respective foot sizes;

said third type shells having a fixed inner configuration for receiving said inner boots of said fifth and sixth foot sizes;

said fourth type shells having a fixed inner configuration for receiving said inner boots of said seventh and eighth foot sizes; and providing inserts for at least some of said shells of said first through fourth shell types for providing said shells with respective inner configurations for matching corresponding inner boots of respective ones of said first through eighth foot sizes.

22. The method as claimed in claim 21, further comprising providing said shells and said inner boots with respective markings indicating which of said shells have which sole length, and which of said inner boots fit into which of said shells.

23. The method as claimed in claim 21, characterized in that an inner boot of a given size is provided to match one shell of a same shell type and an inner boot of a neighboring size is provided to match another shell of the same shell type.

24. The method as claimed in claim 21, further comprising (c) providing a third plurality of ski boots having shells of a respective third sole length, adapted for being inserted in ski bindings mounted on skis and comprising front and rear binding parts disposed on the skis in a third binding spacing;

said third plurality of ski boots (c) are provided with shells of fifth and sixth shell types;

said fifth type shells having a fixed inner configuration for receiving inner boots of ninth and tenth foot sizes;

said sixth type shells having a fixed inner configuration for receiving inner boots of eleventh and twelfth foot sizes; and inserts for at least some of said shells of said fifth and sixth shell types for configuring said shells for matching corresponding inner boots of respective ones of said ninth through twelfth foot sizes.

* * * * *